US012376569B2

(12) United States Patent
Shamsuddin et al.

(10) Patent No.: US 12,376,569 B2
(45) Date of Patent: Aug. 5, 2025

(54) SHED STATE DETECTION MODEL SYSTEM AND METHOD

(71) Applicant: Flox Limited, London (GB)

(72) Inventors: Imtiaz Shamsuddin, London (GB); Nils Hügelmann, London (GB); Luke Robinson, London (GB)

(73) Assignee: FLOX LIMITED, London (GB)

( * ) Notice: Subject to any disclaimer, the term of this patent is extended or adjusted under 35 U.S.C. 154(b) by 163 days.

(21) Appl. No.: 18/228,348

(22) Filed: Jul. 31, 2023

(65) Prior Publication Data

US 2025/0040517 A1   Feb. 6, 2025

(51) Int. Cl.
| | |
|---|---|
| *A01K 29/00* | (2006.01) |
| *G06V 20/20* | (2022.01) |
| *G06V 40/10* | (2022.01) |
| *G10L 17/26* | (2013.01) |
| *G10L 25/66* | (2013.01) |
| *H04N 23/695* | (2023.01) |

(52) U.S. Cl.
CPC ............ *A01K 29/005* (2013.01); *G06V 20/20* (2022.01); *G06V 40/10* (2022.01); *G10L 17/26* (2013.01); *G10L 25/66* (2013.01); *H04N 23/695* (2023.01)

(58) Field of Classification Search
CPC ...... A01K 29/005; A01K 45/00; G06V 20/20; G06V 40/10; G10L 17/26; G10L 25/66; H04N 23/695
See application file for complete search history.

(56) References Cited

U.S. PATENT DOCUMENTS

| | | | |
|---|---|---|---|
| 11,278,007 B2 | 3/2022 | Sarzen et al. | |
| 12,102,055 B2* | 10/2024 | Broers | H05B 47/105 |
| 2014/0267792 A1* | 9/2014 | Mullins | G06F 16/50 |
| | | | 348/207.1 |
| 2022/0022426 A1 | 1/2022 | Berckmans et al. | |
| 2022/0121174 A1 | 4/2022 | Marx et al. | |
| 2023/0019190 A1 | 1/2023 | Shamsuddin et al. | |
| 2023/0066394 A1* | 3/2023 | Mesa | G16H 20/60 |

(Continued)

FOREIGN PATENT DOCUMENTS

| | | | | |
|---|---|---|---|---|
| CN | 113056785 A | * | 6/2021 | ........... A01K 29/005 |
| EP | 4030395 A1 | * | 7/2022 | ............. G06V 40/50 |

(Continued)

OTHER PUBLICATIONS

Sassi et al, "Technology and Poultry Welfare," Poultry Welfare, Oct. 11, 2016.

*Primary Examiner* — Rufus C Point
(74) *Attorney, Agent, or Firm* — PATENT PORTFOLIO BUILDERS PLLC

(57) ABSTRACT

A method includes training a shed state prediction model using a library of data associated with poultry, the shed state prediction model associated with desired shed state goals, receiving realtime information associated with a plurality of poultry from at least one sensor and at least one imaging device in a shed, autonomously performing at least one action on a shed environment of the shed, determining an impact of the at least one action on a shed environment of the shed by determining at least one change of the at least one bird of the plurality of poultry in the shed environment, and improving the shed state prediction model based on the impact of the at least one action on the shed environment.

25 Claims, 6 Drawing Sheets

(56) References Cited

U.S. PATENT DOCUMENTS

2023/0214944 A1\* 7/2023 Gupta .................... G06Q 50/02
                                                                705/7.13
2024/0015386 A1\* 1/2024 Dalati .................... G06V 10/70

FOREIGN PATENT DOCUMENTS

| KR | 102165891 B1 | 10/2020 |
| KR | 20220021339 A | 2/2022 |

\* cited by examiner

SHED STATE DETECTION MODEL SYSTEM AND METHOD

BACKGROUND

It is very difficult and challenging to determine the welfare of poultry and livestock. Current methods are manual (e.g., walking chicken sheds, physically measuring a temperature of a pen). Unrepresentative data points and poor analytics result because of the manual interpretation of the data and/or because the data is inaccurate (e.g., weights of chickens obtained using scales that are inaccurate for older birds). If a farm does not monitor the welfare of its poultry or livestock, this can greatly reduce the yield. This could reduce the efficiency of the farm's limited resources and the short-term and long-term sustainability of the farm. Additionally, failing to determine the welfare of poultry and livestock has eroded the trust of consumers in the supply chain. Improving welfare across a number of farms may provide environmental benefits, improve the welfare of poultry and livestock, and create trust through the supply chain to the consumer.

It is with these issues in mind, among others, that various aspects of the disclosure were conceived.

SUMMARY

According to one aspect, a shed state detection model system and method is provided for determining a shed state including a plurality of poultry and taking action by a shed state detection model in response to realtime data and information. At least one imaging device may obtain realtime information associated with a plurality of poultry located in at least one location. The system may have an artificial intelligence or machine learning model based on a library of poultry data that may include the realtime information associated with the plurality of poultry located in the at least one location. At least one shed computing device and/or at least one server computing device may take at least one action in response to realtime data and information from at least one sensor and/or at least one imaging device in a shed that may be located on a farm or in another location. As an example, the at least one action may be directing at least one lighting device to point to at least one particular location in the shed environment, generating at least one sound in at least one particular location in the shed, providing food to at least one bird of the plurality of poultry in the shed, modifying a temperature in the shed environment, modifying a humidity in the shed environment, and modifying an overall level of light in the shed environment. The at least one action may be taken autonomously by the at least one shed computing device and/or the at least one server computing device. After performing the at least one action, the system may determine an impact of the at least one action on the shed environment of the shed by determining at least one change of at least one animal in the shed environment. Based on the impact of the at least one action, the system may improve the shed state prediction model and continue to train the shed state prediction model.

In one example, a method may include training, by at least one processor, a shed state prediction model using a library of data associated with poultry, the shed state prediction model associated with desired shed state goals, receiving, by the at least one processor, realtime information associated with a plurality of poultry from at least one sensor and at least one imaging device in a shed, autonomously performing, by the at least one processor, at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determining, by the at least one processor, an impact of the at least one action on a shed environment of the shed by determining at least one change of the at least one bird of the plurality of poultry in the shed environment, and improving, by the at least one processor, the shed state prediction model based on the impact of the at least one action on the shed environment.

In another example, a system may include at least one processor of a computing device to train a shed state prediction model using a library of data associated with poultry, the shed state prediction model associated with desired shed state goals, receive realtime information associated with a plurality of poultry from at least one sensor and at least one imaging device in a shed, autonomously perform at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determine an impact of the at least one action on a shed environment of the shed by determining at least one change of the at least one bird of the plurality of poultry in the shed environment, and improve the shed state prediction model based on the impact of the at least one action on the shed environment.

In another example, a non-transitory computer-readable storage medium may have instructions stored thereon that, when executed by at least one computing device cause the at least one computing device to perform operations, the operations including training a shed state prediction model using a library of data associated with poultry, the shed state prediction model associated with desired shed state goals, receiving realtime information associated with a plurality of poultry from at least one sensor and at least one imaging device in a shed, autonomously performing at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determining an impact of the at least one action on a shed environment of the shed by determining at least one change of the at least one bird of the plurality of poultry in the shed environment, and improving the shed state prediction model based on the impact of the at least one action on the shed environment.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
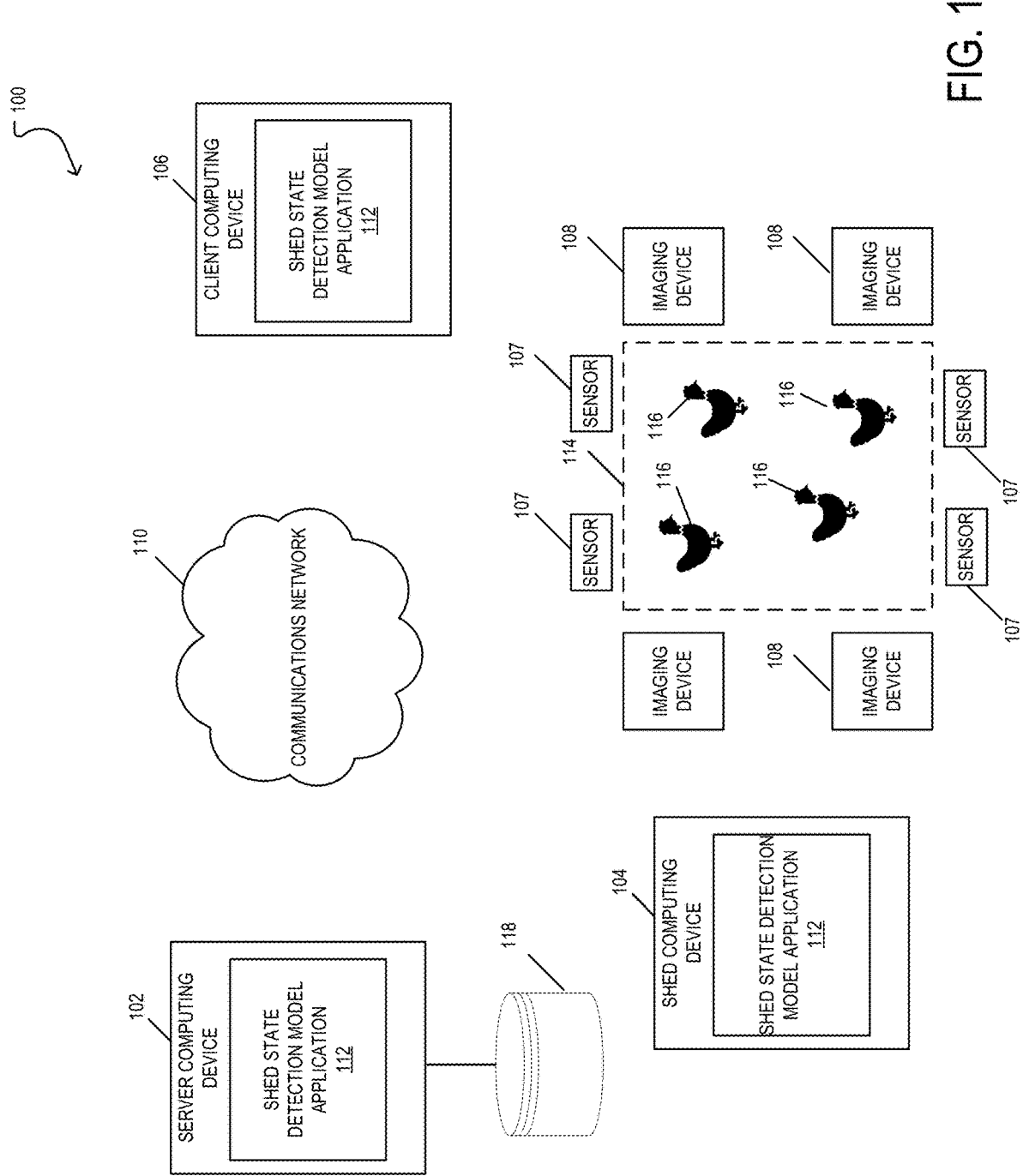
FIG. 1 is a block diagram of a shed state detection model system according to an example of the instant disclosure.

Aspects of a system and method for taking at least one action in a shed in response to realtime data and information may include at least one server computing device, at least one shed computing device, at least one sensor, at least one imaging device, and at least one client computing device that have a shed state detection model application to continually collect information about a state of a shed having a plurality of poultry and input the information about the state of the shed to train the shed state detection model and perform one or more actions in response to the state of the shed.

The at least one imaging device may obtain realtime shed state information including imaging information and sensor information associated with a plurality of poultry located in at least one location such as a shed or one or more sheds. The system may have an artificial intelligence or machine learning model based on a library of poultry data that may include the realtime shed state information associated with the plurality of poultry located in the at least one location. The at least one shed computing device and/or the at least one server computing device may take at least one action in response to realtime data and information from at least one sensor and/or at least one imaging device in the shed that may be located on a farm or in another location. As an example, the at least one action may be autonomously modifying one of a temperature of an environment in the shed, lighting in the environment of the shed, humidity in the environment of the shed, and generating sound in the environment of the shed. The at least one action may be taken autonomously by the at least one shed computing device and/or the at least one server computing device. The poultry may include chickens, turkeys, ducks, geese, and other types of poultry. The system also may be used for livestock that may be located in a building or location having the at least one sensor and/or at least one imaging device.

Improving efficiency starts with systematically measuring efficiency by the system. Efficiency may be related to the livestock growing process, resource usage, emissions, and outputs, among others. In one example, for each imaging device or sensor, the system may determine that a certain section or subset of a shed is indicating particular information about poultry in the subset of the shed and can predict what may happen in the shed as a whole. In particular, the system can obtain information from one or more imaging devices in a section of the shed and use the information to autonomously perform one or more actions to affect one or more birds of a plurality of birds in the shed. In addition, the system can utilize information from multiple sheds to aggregate the data to determine what may happen in an individual shed by training a model that may be applicable to one or more sheds.

The system may utilize analytics information, prediction information, and recommendation information and provide the information to a poultry processing plant and management dashboards to automatically improve poultry processing plant processes and/or better address supply chain changes. The dashboards may be for retail customers, food service companies, integrator operations staff, veterinarians, agri-input, and Pharma companies, among others. The system may be used to forecast and provide predictions for the poultry processing plant and also may provide recommendations such as interventions or physical walks to particular sheds. Interventions could be related to veterinarians remotely checking the sheds or physically visiting, recommending products like medicines or changes to feeding routine, or a farmer walking the shed. Additionally, the system may allow a user to perform a virtual walk to a shed to view information and data such as realtime information and data about the plurality of birds in the shed. The realtime information and data may be related to a current state of the shed, expected state in the future, expected outcome at the factory, and can be used to project the impact of potential changes, In one example, the virtual walk may provide information and data about the shed that may be displayed using an augmented reality (AR) or a virtual reality (VR) display.

The system may process and compress raw data, e.g., image, sound, rate information, into general statistics that may be relevant to a poultry farm. The general statistics may be understandable, identify potential problems, and may be easily transmitted using low bandwidth. In addition, the system may apply data processing techniques to anonymize data and may utilize synthetic data as well as provide data obfuscation that may provide enhancements to privacy. As a result, trade secrets associated with a particular farm may be removed before the data is sent to a server or aggregated with data from other farms by the server. Even further, the anonymized data from multiple farms may be aggregated from multiple farms and producers such that it can be used to provide more meaningful benchmarks that may allow businesses to set bonuses, benchmark progress, and grade outputs. The benchmarks may be used to create meaningful user and industry dashboards. Users may be able to control what is shared to a pool of aggregated data sent to the server. Processed data feeds and benchmark information may be linked from a producer to a supply, e.g., feed, veterinarians, auditors, and retailers to allow for automatic triggering of reordering, farm visits, inspections, price changes, and automatic adjustments to contracts associated with the poultry. As another example, the system may provide one or more recommendations associated with third-party products and may process payments associated with the plurality of poultry. In one example, the payments may be processed using another third-party payment processor, server, or storefront.

In some examples, the plurality of poultry may be located in one or more sheds or locations. As an example, the locations may include indoor locations and/or outdoor locations. The poultry may include free range birds that may be located in indoor locations and/or outdoor locations on a particular farm.

As an example, the system may be used to determine and obtain benchmark analytics from multiple poultry enclosures. The multiple poultry enclosures may be located at one location or more than one location such as one farm or multiple farms. In addition, the system may determine average benchmark information for poultry at a location or farm and may be used to determine overall health or welfare information for the poultry and a respective shed environment at the location or farm or a related region that may include one or more locations or farms. The overall health information may be based on a realtime comparison between a plurality of farms. As an example, a first farm may have poultry that have a health score and/or welfare index that is over a particular threshold, such as an average threshold or a particular minimum threshold. The first farm may have a higher health score and/or welfare index than a second farm. This information may be used to determine which locations or farms are scoring better than other locations or farms. In addition, the information may be used by a user or farmer at a particular location or farm to allow the user or farmer to measure or compare the particular location or farm with another farm or a plurality of farms. In other words, the information may be used by the farmer to allow the farms to measure the farm against benchmarking metrics which are industry metrics, e.g., average poultry metrics. In addition, the user or farmer may view the information using a client computing device and view the information on a graphical user interface (GUI). For example, the user may view a histogram of poultry or bird mortality and counts of poultry or bird mortality in different periods of time. Additionally, the information may be used to track improvements, A/B testing, or control testing. Even further, the information may be used to provide systematic testing to improve benchmarks in quick iterations such as feed additions.

The system may be used to improve feed conversion ratio (FCR) to save feed cost and improve maximum live weight. This may improve the health of the poultry and systematically improve the health of each individual animal. This may enable data-driven operational efficiencies and planning/forecasting for all supply-chain stakeholders. At the same time, consumers may be empowered with informed consumption of high-quality products and have access to provenance and welfare data. The system also may set and provide financial incentives for farmers to increase welfare at one or more farms. The system also can use specific inputs which may have an impact on bird welfare, growth, and emissions and may provide incentives for meeting related goals.

In one example, the system may utilize artificial intelligence as well as data and information obtained from at least one sensor and the at least one imaging device to perform artificial intelligence processing of data obtained by the system. The system may utilize a plurality of different artificial intelligence models. The at least one imaging device may provide farmers full-shed videos of their poultry twenty-four hours a day, seven days a week, day and night, and in realtime. Additionally, the system may generate audiovisual topology information and provide farmers with a topology of poultry (or other animals) in one or more sheds. The system may allow the user to control or automatically control the at least one sensor and/or the at least one imaging device to obtain more robust information about a particular moment or one or more birds that may be exhibiting a particular behavior such as making one or more sounds or actions (or inactions).

As an example, the system may perform artificial intelligence processing of data including at least the following: processing of full shed images (stitched), full mortality detection and analysis, remote farmer access, cluster analysis and alert, footfall analysis (full shed), thermometric sensor analysis, thermal imaging for health, produce sounds for welfare, activity index, ammonia sensing, illness or maim detection by behavior, full individual chicken tracking for research (full shed), directed rover for activity and inspection, pan-tilt-zoom (PTZ) close up view, free-range visual inspection, weighing by sound, directed light to cause activity, visual weighing, drinker/feeder height corrections, podo/hock sickness detection with close view, human in shed detection, litter quality monitoring, shed clean-out detection, chicken count estimate, sound monitoring full shed, robot for inspection and activity, visual inspection at nighttime (including catching), e-nose/smells, recommendation engine, welfare index, anomaly detection, gait scoring, audit support, silo management, activity share analysis, warped view deep dive, pan-tilt-zoom (PTZ) for manual control, activity index, extra IR illumination, mobile access, PTZ close inspection by anomaly detection, macro movement analysis, pose estimation, beacon sensors, farm management tools, deviation from normal indexes as sickness indicator, toys analysis for research, colorization of night vision, outside weather monitoring and alerts, check focused analysis, collecting sound for welfare, flu detection, rover for collection of eggs/dead birds, dominant chicken and cockerels detection, feeding analysis segmentation, feather coverage and feather cleanliness, consumer provenance data that includes documented evidence of origins and an entire journey of the chickens from the farm to the consumer, close view for utilization, research antibiotics, sleep disturbance, light intensity for research or health, management scoring system, outdoor counting, light maps, measuring damaging behaviors, and feeder/drinker popularity analysis, among others. The consumer provenance data may be associated with existing or future supply chain animal welfare/health/human health standards which are legally mandated standards or voluntary certifications including Global Animal Partnership (GAP), RSPCA Assured, and Red Tractor Assurance.

The system may perform processing at the particular location by the at least one shed computing device and/or may perform processing by the at least one server computing device that may be located at a different location. The at least one shed computing device may be on-premises and execute one or more algorithms on the data from the at least one imaging device including images and/or sensor data that may be used to determine one or more actions to perform based on a shed state. Information based on the images and/or sensor data may be provided to one or more users such as farmers to take actions to improve the shed state. However, the system may anonymize the data at the at least one shed computing device before sending the data to the at least one server computing device. As another example, the data could be stored on one or more detachable computer-readable media that may be physically transferred by courier. In addition, the system may send the realtime information as anonymized data and/or may create de-identification data to be combined with the realtime anonymized data that may be sent to the at least one server computing device. In addition, the at least one shed computing device may encrypt the realtime data that is sent to the at least one server computing device. The at least one shed computing device and/or the at least one server computing device may deliver alerts and insights to farms and provide decision-support data to industry stakeholders.

In one example, higher-bandwidth computing tasks and models may be executed by the at least one shed computing device and the at least one server computing device may utilize models that may use pre-aggregated or lower bandwidth data. Additionally, the at least one shed computing device may provide outputs of on-premise models, e.g., aggregate and low-bandwidth data. This may provide a number of benefits including transporting of data in a more efficient manner and providing processing efficiency improvements.

The at least one shed computing device and/or the at least one server computing device may store the realtime anonymized information and/or the de-identification data in the library as well as in a database. Even further, the system may store the information on a distributed ledger or may use one or more blockchains to store information associated with the plurality of poultry. This may provide an auditing system or audit trail that may allow a user to audit or inspect the data to ensure that data was actually collected. This may further allow the system to verify the origin, time, authenticity, completeness, and validity of the data because it may be digitally signed. In addition, there may be multiple levels of audits including a farm level, an aggregate level, a consumer level, and other levels. As an example, there may be a shop/retailer level that may allow the shop or retailer to view welfare data about the poultry available in their one or more shops or one or more retail locations. This may allow an origin or provenance of the data to be shared up and down the supply chain to government regulators and consumers.

As an example, the system may perform a method including training, by at least one processor, an artificial intelligence model using a library of data associated with poultry, receiving, by the at least one processor, realtime information associated with a plurality of poultry from at least one imaging device at a particular location, determining, by the at least one processor, at least one benchmark based on the realtime information associated with the plurality of poultry from the at least one imaging device and using the artificial intelligence model, and generating and sending, by the at least one processor, an alert in realtime to a client computing device based on the realtime information associated with the plurality of poultry.

The library of data may be based on one or more models that are pre-trained using data from other (e.g., previous) farms and then the one or more models may be trained continuously using locally obtained data as well as data from other farms. In other words, initial data may be from other farms to begin but over time the data may be obtained from a particular farm. A specific model may be associated with the particular farm and the specific model will be based on a larger percentage of data from the particular farm that continues to increase over time as more data is collected from the particular farm to train the specific model. The shed computing device may collect ground truth data for model training using automated/manual sources like gait scoring or other welfare metrics calculated by humans, automated scales, shed walk logs including mortality logs, and veterinarian logs, among other information. The data may be used to refine the models. Thus, each time the data is aggregated the model may be generalized and may be utilized with a plurality of sheds and farms.

The shed state detection model system generates a holistic machine learning model that can actively scan one or more sensors and one or more imaging devices in at least one location such as a shed on a farm that collect images and sound, among other data, and execute actions in response to the images and sound (and other data). The actions may be one or more of directing lighting (e.g., one or more lasers) to at least one location in the shed, generating one or more sounds to at least one location in the shed, providing food to at least one animal in the shed, modifying a temperature in at least one location in the shed, modifying an overall level of light in the shed, and sending a person to the shed. In some instances, the person may be physically sent to the shed and in other instances, the person can virtually visit the shed. These actions allow for modification of a shed environment to optimize experimentation to maximize information gain associated with relevant unknown shed states and known shed states.

As an example, the shed state detection model system may generate sound maps associated with the shed, determine a sound topology associated with the shed, determine an audiovisual topology associated with the shed, and determine a visual topology associated with the shed, among others. The shed state detection model system is able to determine sound types from one or more sensors in the shed and determine sound types such as "happy bird" sound types and "unhappy bird" sound types, among others. The one or more sensors may scan one or more locations in the shed at a lower resolution at a first time and then perform a scan at a higher resolution after the first time at a second time to zoom into a situation or moment and allow a user to determine more information about the situation or moment.

This may allow training and improving a shed state prediction model using prediction error toward one or more desired shed state goals. The shed state detection model system is able to filter information flow to one or more users such as one or more farmers, veterinarians, and other experts to avoid sending alerts and keep the number of alerts to a target minimum. The shed state detection model system is able to maximize shed information gain/unit time linked to the one or more desired shed state goals, minimize shed activity labeling efforts/unit time associated with unknown shed states (e.g., supervised training) linked to shed state goals, and allow users such as farmers to adjust desired shed state goals.

The shed state detection model system is able to utilize high and low scan resolutions and zooming capabilities efficiently from one or more imaging devices.

Additionally, the shed state detection model system is able to allow users to follow individual birds for extended periods of time to obtain high fidelity data about individual birds which are showing states associated with negative or positive performance and welfare metrics.

Autonomous Scanning

The shed state detection model system provides autonomous scanning using the sensors and imaging devices. The sensors may allow both active and passive scanning. The imaging devices may include pan-tilt-zoom cameras and may utilize features of the pan-tilt-zoom camera including zoom, focus, movement, use of different spectrums, and directed/undirected microphones on the camera or separate devices that may be controlled by the system (or manually controlled).

Audiovisual Topology Creation

The system allows for manual scanning and creation of a topology of the poultry (or other livestock) shed/house/barn that may be based on chicken health information and chicken state information. As an example, one or more controllable PTZ camera(s) may autonomously scan a shed. Camera speed and zoom can adjust automatically to account for distance and angle to maintain constant ground/bird resolution to determine an audiovisual topology for the shed.

The topology may be based on a shed spatial model that can be defined in a user setup. The shed spatial model may be based on lidar imaging processing, by stereo image processing or through the PTZ camera(s) continually scanning the shed to build a view of its topology, chicken location, and chicken states.

Each PTZ camera can learn topology of a chicken shed using known landmarks that are manually input by a user or using a topology map created or by one or more lidar sensors or a laser or light beam that moves alongside the PTZ camera.

In one example, a light device or a laser mounted on a movable PTZ camera is used to help calibrate multiple cameras. In another example, each PTZ camera may be a static camera with overlapping fields of view that can generate a unified frame of reference by using known points to better map different points of view onto a common point of view.

The topology created by the system could include a two-dimensional, three-dimensional model showing chickens on a map displayed on a touchscreen/monitor or VR or AR system. In one example, the chickens may be shown using a user interface element that may be dots or another two-dimensional representation of a chicken, or a three-dimensional representation of a chicken. The user interface element representation may indicate a current state or status of each chicken.

The system may utilize sensor data from one or more Internet of Things devices (IoT) in the shed to determine temperature/humidity/$CO_2$/ammonia/disease detection.

The system may build a unified model of the dynamic environment that can be used by the system to make changes/alert to issues/validate impact of changes. The system can display the unified model on a graphical user interface (GUI) to the farmer. As an example, each bird may be shown as a point or another user interface element on a map.

Audio Topology Creation

In one example, the system can use a mixture of directed and omni-directional microphone(s) in the shed to search for anomalous sounds and create a normalized audio topology of the shed. If the omni-directional microphone(s) detect a bird or cluster of birds sounding unwell, the system can direct microphone(s) to listen closer to try to confirm a status of one or more birds or even better identify what is wrong. Clips of anomalous audio or audio linked to disease issues can be shared with a user such as a veterinarian/farmer/expert to confirm issues. The system can place the sounds on a map for interaction by a user. The user including a farmer/veterinarian can utilize a GUI to zoom into the map to see why an area is showing audio anomalies.

As another example, the audio topology can also be created by combining information obtained by one or more microphones. Each PTZ camera may have directed or undirected microphones incorporated with the camera. The camera is able to map the sound as obtained in areas as the camera scans the shed. In another example, sound triangulation can be determined from multiple microphones to identify the source of a sound more precisely and to build an audio topology of the shed.

In an example, one or more PTZ cameras may have directed speakers that are incorporated into the PTZ camera. In another example, the speakers can be mounted in the shed in one or more locations.

Directed Scanning to Areas of Interest to Update Topology

The system may utilize directed scanning of areas of interest to update the topology of the shed/house/barn. The system may perform directed scanning automatically by an algorithm that looks for areas of interest or directed scanning manually directed by an expert or farmer finding something interesting and labelling an event or moment as a moment or event of interest.

In one example, a controllable camera can create images/videos from multiple cameras (or a single camera). The controllable camera may be curiosity driven (both anomaly and boundary case driven). Curiosity and anomaly driven can include how one collects the right data to optimize goals. It is particularly relevant when the amount of data one can collect is limited and one can make decisions on where to collect data. It can address the data that optimizes the leaning rate associated with learning to optimize goals. To do this the system can use density distribution features in the input/output goal space associated with the historical data already collected to identify where to collect new data that reduces uncertainty over actions (shed state changes) that maximize goals.

As an example, the controllable camera may capture images/videos when the camera becomes curious in response to an action such as an audible action or a visual action.

When the camera becomes curious, sensors may determine or pick up something interesting (e.g., like an odd sound, a change on the video) and then the camera may turn itself, focus, and zoom to collect more images, videos or (ideally to add sound) on things that are hard to classify to do better in identifying and classifying these things.

In other words, the system may determine that something happens, and at least one camera automatically turns there/focuses there, to try to figure out what may have happened by classifying the event that is difficult to classify. As an example, there may be an undetermined sound in the left of the shed and chickens may be acting a bit odd and bunching up in one corner. The system may determine that something undetermined is happening. At least one camera may point in the direction of the undetermined sound, zoom, and the system may determine that there is a light turned on outside even though its dark disturbing the birds.

In such a situation, the controllable camera may determine to scan at least one region of the shed to collect more images or video sequences that have difficult to classify features, e.g., bird behavior, shed properties, bird health, bird to bird interaction, farmer to bird interaction, farmer to farmer interactions, and farmer to shed interactions, among others.

The system can also zoom into and focus on (e.g., directed movement) certain areas of interest to obtain finer details or more robust information about one or more birds or one or more moments including potentially diseased birds (subclinical or clinical detection) or clusters of birds, obtaining weights of birds, search for positive bird welfare behaviors like dust bathing or negative bird welfare behaviors like feather pecking of other birds or identifying a person who should not be in the shed or identifying if a person who should be in the shed is actually in there at a certain time.

As an example, the system can zoom in and focus on a location of the farmer/expert doing a shed walk which feeds back to the PTZ cameras. The cameras and any directional microphones may focus attention to where the person is to increase sound and image resolution of the person as they are walking through the shed.

Human in the Loop

The system may direct or send snippets of images/videos of interest to particular users that have permission to view the snippets. Each snippet may have a value or importance level of each snippet. In addition, each snippet may have a security value. Each user may have a security level and users may only be able to view snippets when their security level is equal to or greater than the security level of the importance level of the snippet.

As an example, a data pipeline can be used to direct images and video to a farmer and/or an expert, e.g., veterinarian or nutritionist (with farmer or management signoff) to label images as being anomalous or important (human in the loop) and determine classes of behavior that are health related (or other economic considerations).

Data may be stored selectively (so as to minimize storage space) and used to train a classification algorithm used to find behaviors and autonomously classify behaviors in the future.

As an example, a farmer and/or expert can label adverse behaviors with cost with welfare metrics that go into a shed economic and traceability model that can allow the farmer to better manage many sheds at once and focus on other things that matter when operating a farm.

As an example, the system can use the three-dimensional shed topology and/or audio topology to create and perform virtual shed walks where a farmer, veterinarian, or expert can view a representation of the shed in realtime on a graphical display that may include an augmented reality display or a virtual reality display of the shed. The user can view the shed virtually and view data related to bird welfare and the shed environment to reduce or augment the number of physical walks required.

Influencing State to Optimise

The system may influence a state of the shed/house/barn in a series of interactions so as to optimize the state of the birds or the environment of the birds.

In one example, the system can influence the state of the shed, through a series of interactions (e.g., influencing birds through actions or changes to the shed). As an example, the system can modify temperature or humidity in the shed, modify lighting in the shed, direct one or more lighting device such as a laser or direct one or more sounds using one or more audio devices such as speakers. The interactions may be selected from a list of actions possible and may be autonomously caused by the system based on a number of variables in the shed at any one moment in time.

Measure Impact of Influence

The system may measure an impact of an influence on birds or the environment of the birds. In one example, the system can determine an impact of the influence on the shed topology/birds/environment.

Action to Close the Loop

The system may perform an action to "close the loop." As an example, the system may record an interaction with one or more birds or an impact of an interaction and may send a message or information to one or more users that may be relevant to the interaction or may be interested in information (e.g., one or more farmers).

As another example, the system may calibrate the model using ground truth information, e.g., using a lidar/laser/other sensor to calibrate the model's knowledge of bird size or real ground truth location of birds.

After determining an impact of influence, the system can perform another action. In one example, the action can automatically place a telephone call or send or transmit a message to one or more user computing devices. As an example, the system can send a message and/or a push notification including information and/or data associated with the shed. The message may include one or more videos of the shed and/or one or more photographs of the shed that may indicate one or more issues and one or more actions that may have been autonomously taken by the system. The message may be sent to one or more users that may be interested in the actions taken by the system such as one or more farmers, one or more veterinarians, or one or more other experts. Additionally, the system may determine and store information associated with the actions that may have been taken such as an outcome of the actions to determine whether the actions were successful or had any impact on the shed. The system also may store the information and any associated data in a database such as a level of light and any change in the level of light, a level of sound and any change in the level of sound, a temperature and any change made in the temperature, and a humidity level and any change made in the humidity level, among other actions taken.

As an example, a shed state detection model system may include at least one processor of a computing device to train a shed state prediction model using a library of data associated with poultry, the shed state prediction model associated with desired shed state goals, receive realtime information associated with a plurality of poultry from at least one sensor and at least one imaging device in a shed, autonomously perform at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determine an impact of the at least one action on a shed environment of the shed by determining at least one change of the at least one bird of the plurality of poultry in the shed environment, and improve the shed state prediction model based on the impact of the at least one action on the shed environment.

An action could be sending a veterinarian to check on at least one bird of the plurality of poultry. The action can be triggered autonomously. As another example, an action may be related to detecting the presence of a human in a shed. A farmer could set a shed state goal to be "No human should be in the shed between 8 pm and 3 am." An action may be activating an alert. A camera may zoom into an area of the shed when a human is detected and an action may be taken, e.g., sending an alert or alarm related to the presence of a human. A farmer can provide a response to the alert to confirm there are no issues or visit the shed.

At least one change of a bird may be related to bird metrics such as weight of a bird, uniformity of growth, signs of illness, a temperature of the shed, water consumed by a bird, and others.

The actions may include at least one pointing device producing heat/cold/air/releasing a specific gas or odor, providing food/feed additive, and a pharmaceutical, among others. The timing of the action can be important too as feeding routines are important, so the system could also choose when to release feed one day, and change it based on what it is detecting in the shed state model.

The actions may include directing an autonomous robot to an area of a shed to take a physical action like aerating or spraying the poultry litter to improve the poultry litter, or sampling the area for disease, or moving chickens around. As another example, an action may include contacting an appropriate person/group who can take a manual action or remotely deciding to adjust something in the shed.

Improvements to the shed state prediction model may include changes in accuracy of classifying/predicting a shed's state. A shed state may be related to the environment of the shed, birds, bird actions, how the birds interact with the environment, and others.

FIG. 1 illustrates a block diagram of a shed state detection model system 100 according to an example embodiment. The shed state detection model system 100 may include a plurality of computing devices including at least one server computing device 102, at least one shed computing device 104, at least one client computing device 106, at least one sensor 107, and at least one imaging device 108 that communicate via a communication network 110. The at least one server computing device 102 and/or the at least one shed computing device 104 may be one or more computing devices, a virtual machine, a container, or another computing virtualization that may be capable of executing one or more programs or applications. The at least one server computing device 102, the at least one shed computing device 104, and the at least one client computing device 106 may execute and deploy a shed state detection model application 112.

As shown in FIG. 1, the at least one sensor 107 and the at least one imaging device 108 may be used to obtain realtime shed state information for a plurality of poultry 116 that may be physically located at a particular location 114. The particular location 114 may be an enclosure, shed, pen, fenced area, or another location that houses the plurality of poultry 116. The plurality of poultry may include one or more chickens, one or more turkeys, one or more ducks, and/or one or more geese. A particular farm may have a plurality of particular locations 114, e.g., a plurality of enclosures, sheds, pens, or fenced areas that may be monitored by the at least one sensor 107 and the at least one imaging device 108. Alternatively, the particular location 114 may be an enclosure, shed, pen, fenced area, or another location that may house livestock such as cattle, sheep, pigs, lambs, horses, goats, and/or other animals.

The at least one server computing device 102 is configured to receive data from and/or transmit data to the at least one shed computing device 104, the at least one client computing device 106, the at least one sensor 107, and the at least one imaging device 108 through the communication network 110. Although the at least one server computing device 102 is shown as a single computing device, it is contemplated that the at least one server computing device 102 may include multiple computing devices. In addition, although the at least one shed computing device 104 is shown as a single computing device, it is contemplated that the at least one shed computing device 104 may include multiple computing devices. In addition, although the at least one client computing device 106 is shown as a single computing device, it is contemplated that the at least one client computing device 106 may include multiple computing devices.

The communication network 110 can be the Internet, an intranet, or another wired or wireless communication network. For example, the communication network 110 may include a Mobile Communications (GSM) network, a code division multiple access (CDMA) network, 3rd Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one server computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the shed state detection application 112. In addition, the at least one server computing device 102 further includes at least one communications interface to transmit and receive communications, messages, and/or signals.

The at least one shed computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the shed state detection application 112. In addition, the at least one shed computing device 104 further includes at least one communications interface to transmit and receive communications, messages, and/or signals.

The at least one client computing device 106 can be a laptop computer, a smartphone, a personal digital assistant, a tablet computer, a standard personal computer, a virtual reality (VR) headset/computing device, or another processing device. The at least one client computing device 106 may include a display, such as a computer monitor, for displaying data and/or graphical user interfaces. The at least one client computing device 106 may also include a Global Positioning System (GPS) hardware device or other location systems (e.g., other satellite systems or WiFi triangulation) for determining a particular location of the client computing device 106, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer. In one example, the computer monitor may be one or more virtual reality display devices.

The at least one client computing device 106 may display on the display a graphical user interface (or GUI). The graphical user interface may be provided by the shed state detection application 112. The graphical user interface enables a user of the at least one client computing device 106 to interact with the shed state detection application 112. As an example, each user of the client computing device 106 may view a realtime view of a state of a shed and information associated with an environment of the shed in realtime.

The shed state detection application 112 may be a component of an application and/or service executable by the at least one server computing device 102, the at least one shed computing device 104, the at least one client computing device 106, the at least one sensor 107, and the at least one imaging device 108. For example, the shed state detection application 112 may be a single unit of deployable executable code or a plurality of units of deployable executable code. According to one aspect, the shed state detection application 112 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The at least one sensor 107 and the at least one imaging device 108 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the shed state detection application 112. In addition, the at least one imaging device 108 further includes at least one communications interface to transmit and receive communications, messages, and/or signals.

The at least one imaging device 108 may have one or more cameras or imaging devices such as a pan-tilt-zoom (PTZ) camera, a hyperspectral/multispectral camera, a low-resolution camera, a high-definition camera, an infrared camera, and the at least one sensor 107 may be one or more sensors such as a temperature sensor, a chemical sensor, an air pressure sensor, an audio sensor, a microphone, an ammonia sensor, a humidity sensor, a light sensor, a $CO_2$ sensor, an eNose or electronic nose sensor, a disease detector, a wind speed detector, a dust monitor, a vibration sensor such as an accelerometer, a LIDAR sensor, a millimeter wave sensor, and an X-ray device. At least one sensor 107 and/or the at least one imaging device 108 may include one or more display devices for displaying output and/or a graphical user interface (GUI) and may include one or more speakers to provide output. The display device may be a touch screen device. The display device also may be or include one or more lights or light-emitting diodes (LEDs).

The at least one sensor 107 and/or the at least one imaging device 108 may encrypt data obtained by the at least one imaging device before transmitting the data to another computing device associated with the system 100 and/or outside of the system. The data collected by the at least one sensor 107 and/or the at least one imaging device 108 may be processed at the particular location 114 by the at least one imaging device 108 and/or the shed computing device 104. The server computing device 102 may be located on-premises at a farm and/or off-premises. The data may be transmitted off-premises to the server computing device 102 and processed at the server computing device 102. In further examples, it may be processed at both the particular location 114 by the at least one sensor 107 and/or the at least one imaging device 108 and/or the shed computing device 104 and the server computing device 102.

The shed state detection model system 100 may also include a relational database management system (RDBMS), a timeseries database system, a blob storage system, or another type of database management system such as a NoSQL database system that stores and communicates data from at least one database 118. As an example, the at least one database 118 may store information associated with the plurality of poultry 116 at the particular location 114 such as shed state information about the plurality of poultry from one or more sheds, actions taken to address the shed state, and information associated with an impact on the actions taken to address the shed state. The at least one database 118 may also store information from multiple different pluralities of poultry located at a plurality of locations.

Figure 2:
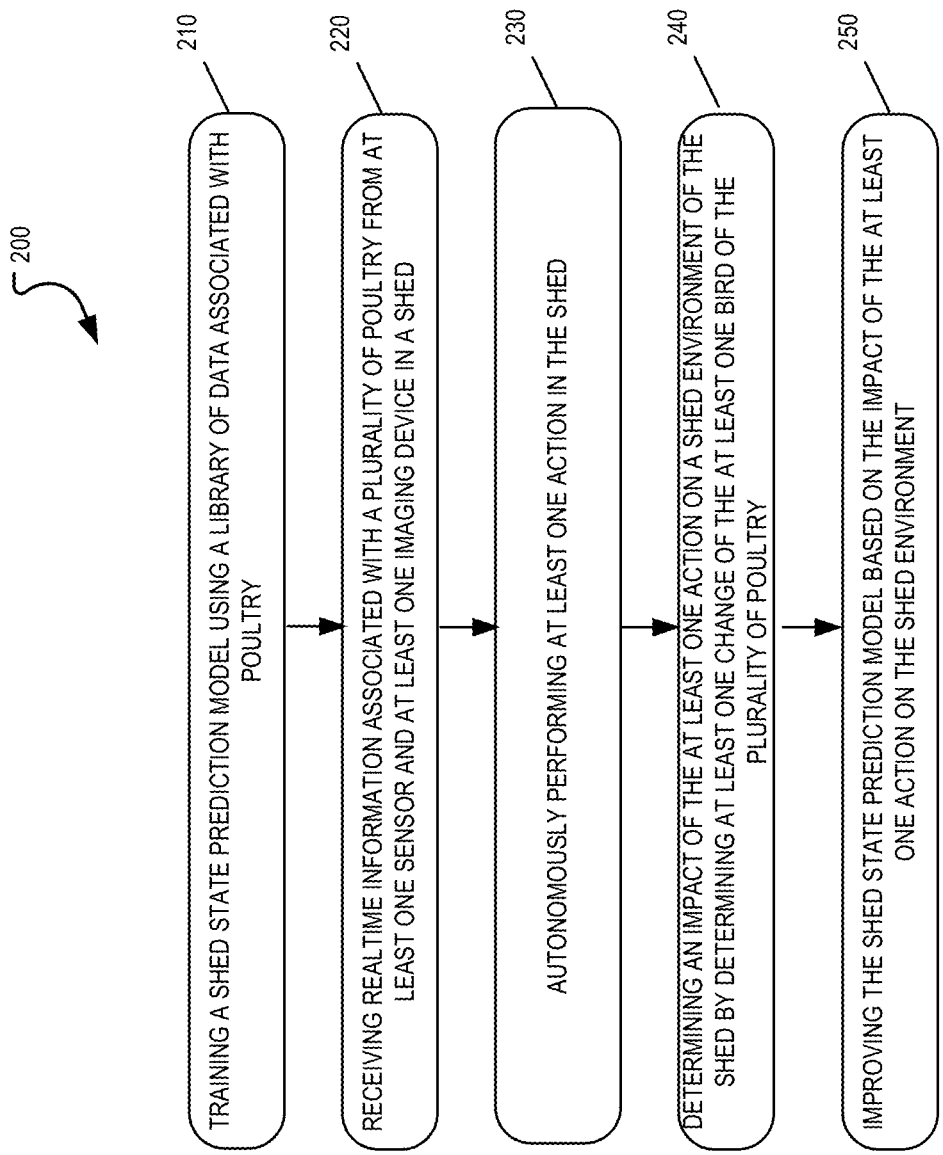
FIG. 2 is a flowchart of a method of taking at least one action in response to realtime data and information from at least one sensor and/or at least one imaging device in a shed in response to a shed state according to an example of the instant disclosure.

FIG. 2 illustrates an example method 200 for executing one or more functions provided by the shed state detection application 112. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 may include training a shed state prediction model using a library of data associated with poultry, the shed state prediction model associated with desired shed state goals at block 210. Desired shed state goals may include goals that farmers, processors, or retailers have for a shed. The shed state goals can be different from farmer to farmer. Shed state goals are measurable/quantifiable things that can be used to train an optimization algorithm. The measurable/quantifiable things may include chicken health/welfare (disease count), growth rate, litter quality, low cost, factory waste, leg issues, and others. The system can determine path dependent effects (in chicken health and litter quality) and train a model to identify the relationship between inputs and outputs (goals). The system can use the model to map the space of shed outputs over the shed cycle against inputs sequences to optimize against goals.

Figure 4:
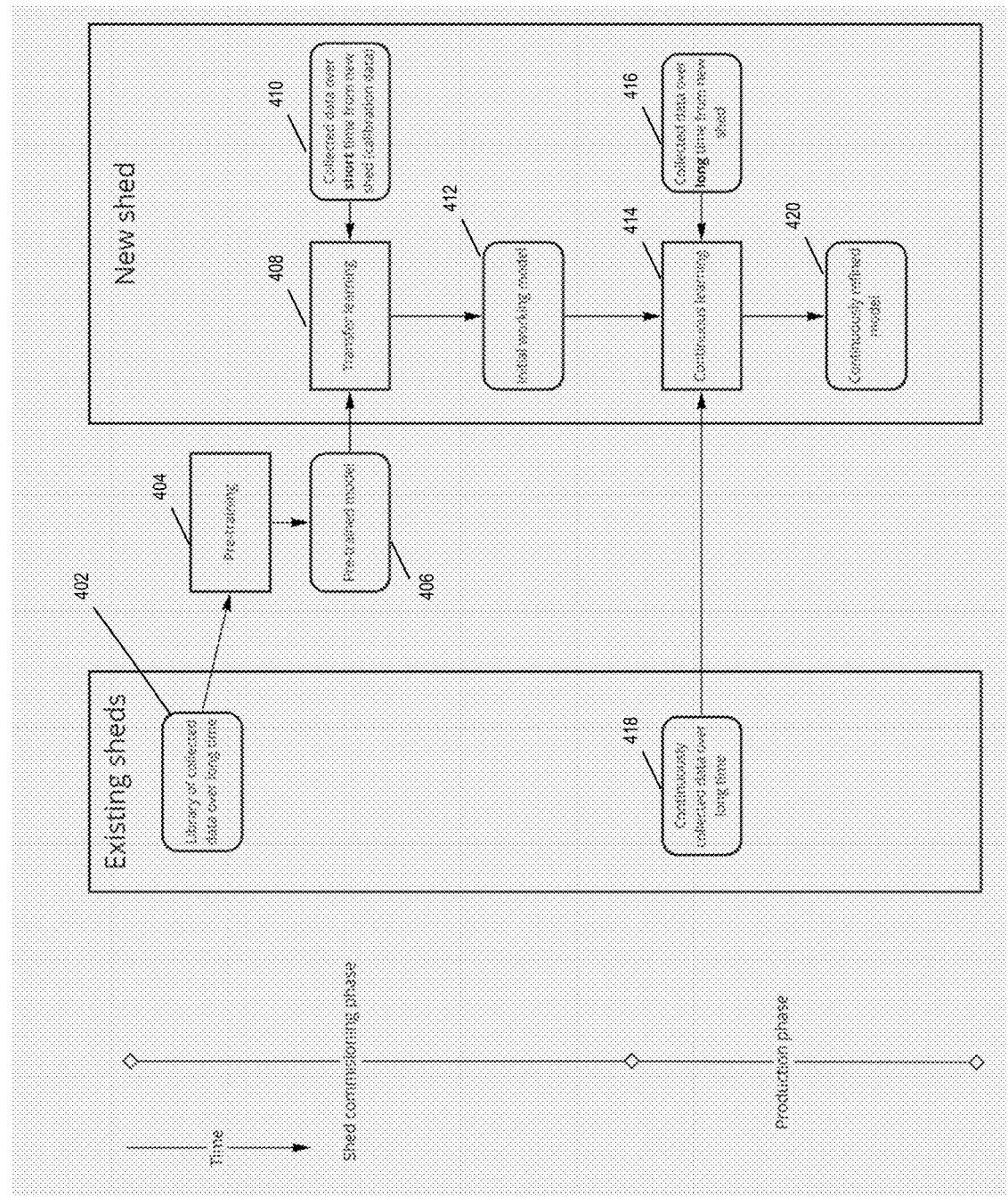
FIG. 4 shows a diagram associated with generating and training an artificial intelligence model for use by the shed state detection model system according to an example of the instant disclosure.

An example of training the artificial intelligence model and generating the library of data is shown in FIG. 4.

According to some examples, the method 200 may include receiving realtime information associated with a plurality of poultry 116 from the at least one sensor 107 and at least one imaging device 108 in a shed 114 at block 220. As an example, the at least one imaging device 108 may be at least one pan, tilt, zoom (PTZ) camera. As an example, the at least one sensor 107 may be a temperature sensor, a humidity sensor, a $CO_2$ sensor, an ammonia sensor, and at least one microphone.

According to some examples, the method 200 may include autonomously performing at least one action on a shed environment of the shed 114, the at least one action comprising at least one of directing at least one lighting device to point to at least one particular location in the shed 114, generating at least one sound in at least one particular location in the shed, providing food to at least one bird of the plurality of poultry 116 in the shed, modifying a temperature in the shed, modifying a humidity in the shed, and modifying an overall level of light in the shed at block 230.

According to some examples, the method 200 may include determining an impact of the at least one action on a shed environment of the shed 114 by determining at least one change of the at least one bird of the plurality of poultry 116 in the shed environment at block 240.

According to some examples, the method 200 can include improving the shed state prediction model based on the impact of the at least one action on the shed environment at block 250.

According to some examples, the method 200 may include generating a media snippet or clip comprising information associated with at least one moment associated with the impact of the at least one action, the media snippet having a level of importance. The media snippet may include one of a video file, an audio file, and an image file associated with the at least one moment. According to some examples, the method 200 may include sending the media snippet to at least one client computing device of a user having a security level that is greater than or equal to the level of importance.

According to some examples, the method 200 includes following, by the at least one sensor and the at least one imaging device, at least one bird of the plurality of poultry 116 to determine data about the at least one bird after performing the at least one action and determining welfare metrics for the at least one bird based on the data.

In some examples, the method 200 may include performing autonomous scanning using at least one of passive scanning and active scanning of the shed environment using the at least one pan, tilt, zoom (PTZ) camera.

According to some examples, the method 200 includes generating an audiovisual topology of the shed environment based on the realtime information associated with the plurality of poultry 116 from the at least one sensor 107 and the at least one imaging device 108. According to some examples, the method 200 includes determining a topology of the plurality of poultry 116. The topology may be a three-dimensional model. As another example, the three-dimensional model can be displayed by at least one of a virtual reality display and an augmented reality display. As an example, the at least one sensor 107 may be the at least one microphone and the topology of the plurality of poultry is based on data from the at least one microphone in the shed environment.

According to some examples, the method 200 includes automatically determining at least one area of interest in the shed environment and labeling the at least one area of interest based on the audiovisual topology of the shed environment.

According to some examples, the method 200 includes influencing a state of the shed environment using the at least one action to optimize a state of the plurality of poultry 116.

According to some examples, the method 200 includes determining an impact of the at least one action on each bird of the plurality of poultry.

According to some examples, the method 200 may include storing information associated with the audiovisual topology of the shed information in a database and sending at least one alert associated with an action in the shed environment to request that a person visit the shed environment. As an example, the person may be one of a farmer and a veterinarian.

According to some examples, the method 200 may include determining whether each bird of the plurality of poultry 116 is happy or unhappy based on sound types received by the at least one sensor 107. In another example, the method 200 may include determining whether each bird is showing signs of being high welfare and/or healthy.

According to some examples, the method 200 may include collecting at least one image from the at least one pan, tilt, zoom (PTZ) camera to determine at least one of bird behavior, shed properties of the shed environment, bird health, bird to bird interaction, farmer to bird interaction, farmer to farmer interaction, and farmer to shed interaction.

According to some examples, the method 200 may include defining the shed state prediction model based on user setup information associated with lidar processing, stereo image processing, and pan, tilt, zoom (PTZ) camera scanning information to build a view of the shed environment.

According to some examples, the method 200 may include detecting at least one bird of the plurality of poultry 116 to be making sounds indicating the at least one bird is unwell based on audio information having a first resolution level and directing the at least one microphone to determine a second resolution level of audio information higher than the first resolution level associated with the at least one bird.

According to some examples, the method 200 may include detecting at least one bird of the plurality of poultry 116 to be unwell based on visual information having a first resolution level and directing the at least one imaging device to determine a second resolution level of visual information higher than the first resolution level associated with the at least one bird.

According to some examples, the method 200 may include generating a three-dimensional shed topology for the shed environment to provide a virtual shed walk of the shed environment and display the virtual shed walk on one of an augmented reality (AR) display and a virtual reality (VR) display.

According to some examples, the method 200 may include receiving input comprising a change in the shed state goals and modifying the shed state prediction model based on the change in the shed state goals.

Figure 3:
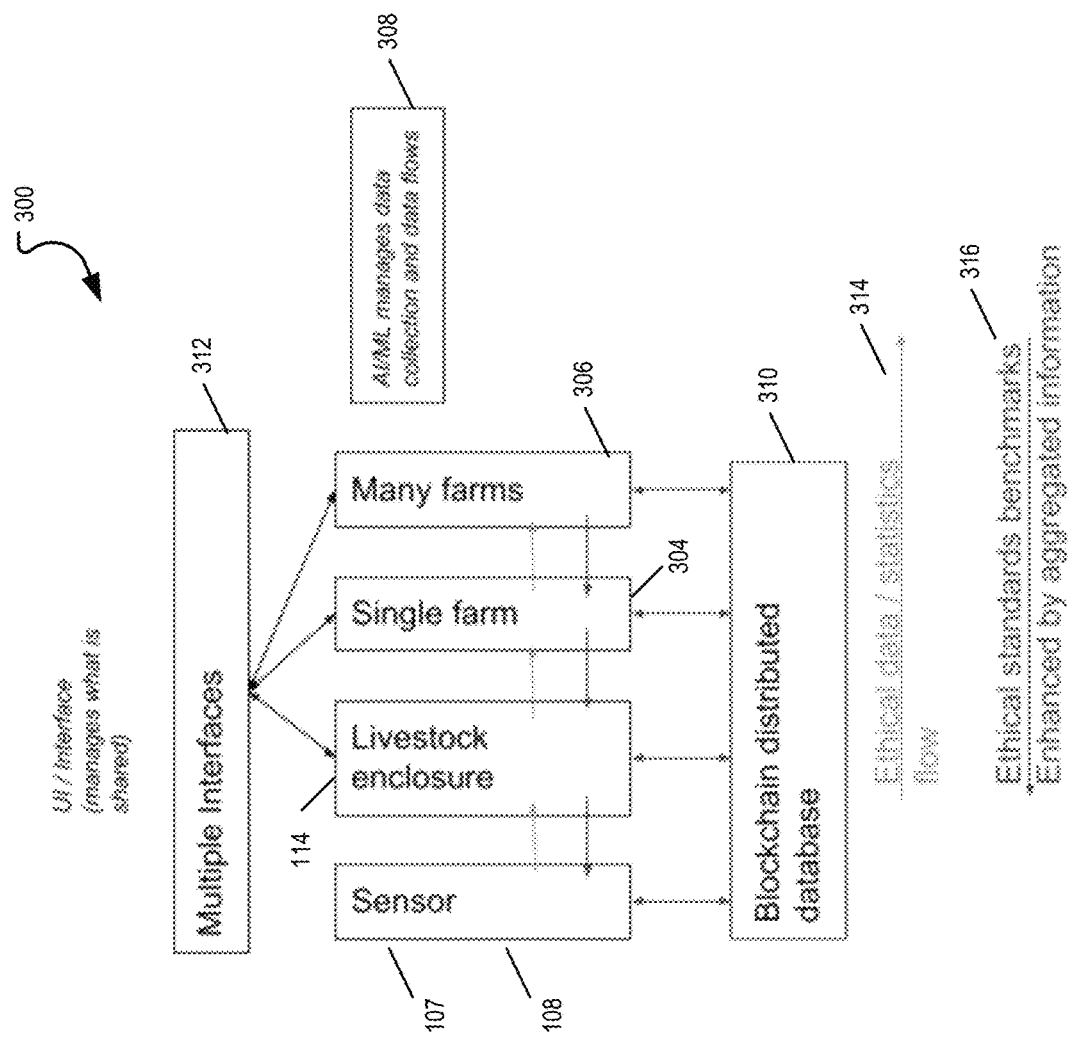
FIG. 3 is a diagram of the data flow and communication of the shed state detection model system according to an example of the instant disclosure.

FIG. 3 shows a diagram 300 of data flow and communication of the system 100 according to an example of the instant disclosure. As shown in FIG. 3, one or more sensors 107 and the one or more imaging devices 108 may obtain data and images at one or more poultry enclosures or sheds 114. The data associated with the one or more poultry enclosures 114 may be incorporated or combined with the data and images from a single farm 304 or from many other farms 306. The data and images may be managed using artificial intelligence and machine learning 308. This data and images may be stored in a blockchain distributed database 310 and may be provided to one or more users via one or more interfaces 312. In addition, the data and images may be provided as ethical data or statistics data 314. The ethical data/statistics may be based on ethical standards benchmarks and may be enhanced by aggregated information 316.

FIG. 4 shows a diagram associated with generating and training an artificial intelligence model for use by the shed state detection model system 100 according to an example of the instant disclosure. FIG. 4 shows the process of commissioning the system 100 in a new shed, by using data and models created in existing previous sheds. The previous ("pre-trained") model can be used quickly in a new shed after just one training iteration that uses a small amount of data from the new shed. Then, over time, it is refined continuously with new data as it is collected.

As shown in FIG. 4, the artificial intelligence model may be based on a library of collected data 402 that may be from a plurality of farms obtained from existing sheds to start. At this point, a farm with one or more sheds may execute pre-training 404 using a pre-trained model 406 based on the library of collected data 402 from other sheds from a particular farm or from one or more farms. A new shed on a farm may begin transfer learning 408 and collect data over a shorter period of time from the new shed. This may be known as calibration data 410. This may be used to generate an initial working model 412. The new shed may perform continuous learning 414 and continue to collect data from the new shed 416 and data from other existing sheds 418 that may be combined with the data from the new shed. The data collected over the longer period of time from the new shed and the data from the other existing sheds may be combined during the continuous learning to create the continuously refined model 420.

The training of the artificial intelligence model such as the shed state detection model may be a repeating process. As an example, data may be collected on a first day and labeled. The data may then be used to train and refine the model. This may be repeated each day and it may be fully automated. In some examples, the training may run continuously, e.g., once a minute or at a particular interval of time. The training of the artificial intelligence model provides value in adapting for data and model drift. As an example, a farm may utilize a new breed of bird. The system may recognize the new breed and can train the artificial intelligence model in a short period of time.

As another example, the training of the artificial intelligence model may be related to one or more of processing of full shed images (stitched), full mortality detection and analysis, remote farmer access, cluster analysis and alert, footfall analysis (full shed), thermometric sensor analysis, thermal imaging for health, produce sounds for welfare, activity index, ammonia sensing, illness or maim detection by behavior, full individual chicken tracking for research (full shed), directed rover for activity and inspection, pan-tilt-zoom (PTZ) close up view, free-range visual inspection, weighing by sound, directed light to cause activity, visual weighing, drinker/feeder height corrections, podo/hock sickness detection with close view, human in shed detection, litter quality monitoring, shed clean-out detection, chicken count estimate, sound monitoring full shed, robot for inspection and activity, visual inspection at nighttime (including catching), e-nose/smells, recommendation engine, welfare index, anomaly detection, gait scoring, audit support, silo management, activity share analysis, warped view deep dive, pan-tilt-zoom (PTZ) for manual control, extra IR illumination, mobile access, pan-tilt-zoom (PTZ) close inspection by anomaly detection, macro movement analysis, pose estimation, beacon sensors, farm management tools, deviation from normal indexes as sickness indicator, toys analysis for research, colorization of night vision, outside weather monitoring and alerts, check focused analysis, collecting sound for welfare, flu detection, rover for collection of eggs/dead birds, dominant chicken and cockerels detection, feeding analysis segmentation, feather coverage and feather cleanliness, consumer provenance data associated with Mother Hen, close view for utilization, research antibiotics, sleep disturbance, light intensity for research or health, management scoring system, outdoor counting, light maps, measuring damaging behaviors, and feeder/drinker popularity analysis, among others.

Figure 5:
FIG. 5 shows a view of a graphical user interface of the shed state detection model system according to an example of the instant disclosure.

FIG. 5 shows a view of a graphical user interface of the shed state detection model system 100 according to an example of the instant disclosure. As noted herein, the topology created by the system 100 could include a two-dimensional, three-dimensional model showing chickens on a map displayed on a touchscreen/monitor or VR or AR system. In one example, the chickens may be shown using a user interface element that may be dots or another two-dimensional representation of a chicken, or a three-dimensional representation of a chicken. The user interface element representation may indicate a current state or status of each chicken.

In particular, FIG. 5 shows a first view 502 of a bird spread in a particular location such as a shed according to an example of the instant disclosure. Each dot or pixel shown in the view 502 represents a particular bird. In addition, FIG. 5 shows a second view 504 of another bird spread in a shed according to an example of the instant disclosure. Each dot or pixel shown in the view 504 represents a particular bird.

Figure 6:
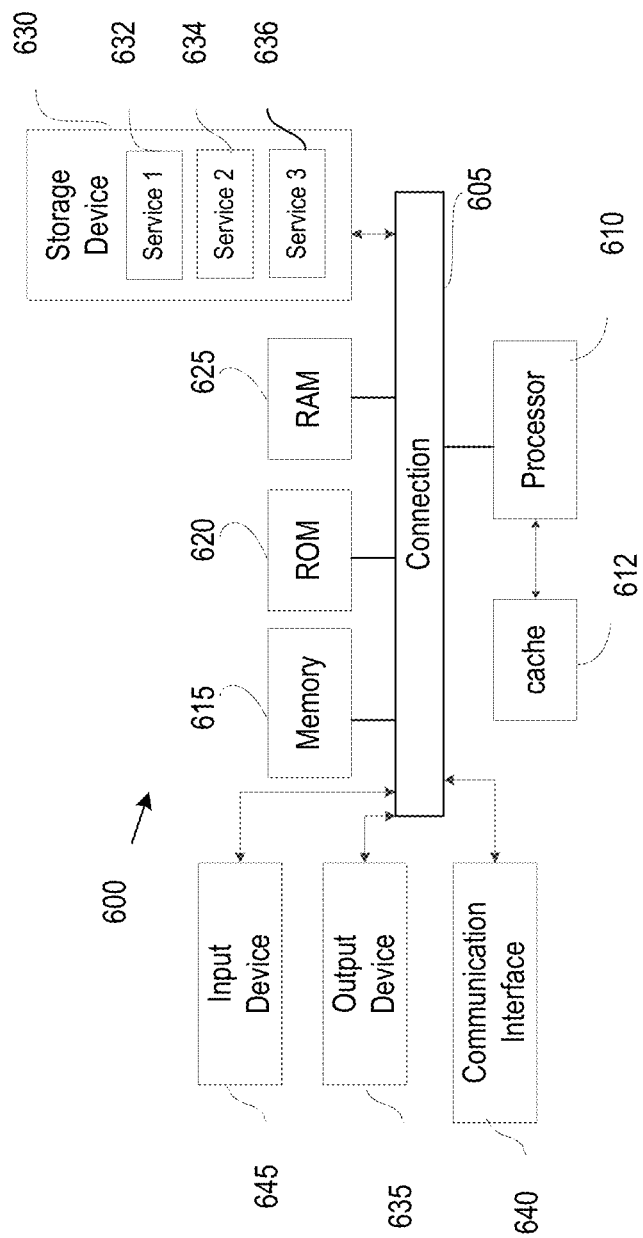
FIG. 6 shows an example of a system for implementing certain aspects of the present technology.

FIG. 6 shows an example of computing system 600, which can be for example any computing device making up the at least one server computing device 102, the at least one shed computing device 104, the at least one client computing device 106, the at least one sensor 107, and the at least one imaging device 108, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising training, by at least one processor, a shed state prediction model using a library of data associated with poultry, the shed state prediction model associated with desired shed state goals, receiving, by the at least one processor, realtime information associated with a plurality of poultry from at least one sensor and at least one imaging device in a shed, autonomously performing, by the at least one processor, at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determining, by the at least one processor, an impact of the at least one action on a shed environment of the shed by determining at least one change of the at least one bird of the plurality of poultry in the shed environment, and improving, by the at least one processor, the shed state prediction model based on the impact of the at least one action on the shed environment.

Aspect 2: The method of Aspect 1, further comprising generating a media snippet comprising information associated with at least one moment associated with the impact of the at least one action, the media snippet having a level of importance.

Aspect 3: The method of Aspects 1 and 2, wherein the media snippet comprises one of a video file, an audio file, and an image file associated with the at least one moment.

Aspect 4: The method of any of Aspects 1 to 3, further comprising sending the media snippet to at least one client computing device of a user having a security level that is greater than or equal to the level of importance.

Aspect 5: The method of any of Aspects 1 to 4, further comprising following, by the at least one sensor and the at least one imaging device, at least one bird of the plurality of poultry to determine data about the at least one bird after performing the at least one action and determining welfare metrics for the at least one bird based on the data.

Aspect 6: The method of any of Aspects 1 to 5, wherein the at least one imaging device comprises at least one pan, tilt, zoom (PTZ) camera, the method further comprising performing autonomous scanning using at least one of passive scanning and active scanning of the shed environment using the at least one pan, tilt, zoom (PTZ) camera.

Aspect 7: The method of any of Aspects 1 to 6, further comprising generating an audiovisual topology of the shed environment based on the realtime information associated with the plurality of poultry from the at least one sensor and the at least one imaging device.

Aspect 8: The method of any of Aspects 1 to 7, wherein the audiovisual topology comprises a three-dimensional model.

Aspect 9: The method of any of Aspects 1 to 8, wherein the three-dimensional model is displayed by at least one of a virtual reality display and an augmented reality display.

Aspect 10: The method of any of Aspects 1 to 9, wherein the at least one sensor comprises the at least one microphone and the audiovisual topology based on data from the at least one microphone in the shed environment.

Aspect 11: The method of any of Aspects 1 to 10, further comprising automatically determining at least one area of interest in the shed environment and labeling the at least one area of interest based on the audiovisual topology of the shed environment.

Aspect 12: The method of any of Aspects 1 to 11, further comprising influencing a state of the shed environment using the at least one action to optimize a state of the plurality of poultry.

Aspect 13: The method of any of Aspects 1 to 12, further comprising determining an impact of the at least one action on each bird of the plurality of poultry.

Aspect 14: The method of any of Aspects 1 to 13, further comprising storing information associated with the audiovisual topology of the shed information in a database and sending at least one alert associated with an action in the shed environment to request that a person visit the shed environment.

Aspect 15: The method of any of Aspects 1 to 14, wherein the person comprises one of a farmer and a veterinarian.

Aspect 16: The method of any of Aspects 1 to 15, further comprising determining whether each bird of the plurality of poultry is happy or unhappy based on sound types received by the at least one sensor.

Aspect 17: The method of any of Aspects 1 to 16, wherein the at least one sensor comprises a temperature sensor, a humidity sensor, a $CO_2$ sensor, an ammonia sensor, and at least one microphone.

Aspect 18: The method of any of Aspects 1 to 17, further comprising collecting at least one image from at least one pan, tilt, zoom (PTZ) camera to determine at least one of bird behavior, shed properties of the shed environment, bird health, bird to bird interaction, farmer to bird interaction, farmer to farmer interaction, and farmer to shed interaction.

Aspect 19: The method of any of Aspects 1 to 18, further comprising defining the shed state prediction model based on user setup information associated with lidar processing, stereo image processing, and pan, tilt, zoom (PTZ) camera scanning information to build a view of the shed environment.

Aspect 20: The method of any of Aspects 1 to 19, further comprising detecting at least one bird of the plurality of poultry to be making sounds indicating the at least one bird is unwell based on audio information having a first resolution level and directing the at least one microphone to determine a second resolution level of audio information higher than the first resolution level associated with the at least one bird.

Aspect 21: The method of any of Aspects 1 to 20, further comprising detecting at least one bird of the plurality of poultry to be unwell based on visual information having a first resolution level and directing the at least one imaging device to determine a second resolution level of visual information higher than the first resolution level associated with the at least one bird.

Aspect 22: The method of any of Aspects 1 to 21, further comprising generating a three-dimensional shed topology for the shed environment to provide a virtual shed walk of the shed environment and display the virtual shed walk on one of an augmented reality (AR) display and a virtual reality (VR) display.

Aspect 23: The method of any of Aspects 1 to 22, further comprising receiving input comprising a change in the shed state goals and modifying the shed state prediction model based on the change in the shed state goals.

Aspect 24: A system including at least one processor of a computing device to train a shed state prediction model using a library of data associated with poultry, the shed state prediction model associated with desired shed state goals, receive realtime information associated with a plurality of poultry from at least one sensor and at least one imaging device in a shed, autonomously perform at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determine an impact of the at least one action on a shed environment of the shed by determining at least one change of the at least one bird of the plurality of poultry in the shed environment, and improve the shed state prediction model based on the impact of the at least one action on the shed environment.

Aspect 25: A non-transitory computer-readable storage medium, having instructions stored thereon that, when executed by at least one computing device cause the at least one computing device to perform operations, the operations comprising training a shed state prediction model using a library of data associated with poultry, the shed state prediction model associated with desired shed state goals, receiving realtime information associated with a plurality of poultry from at least one sensor and at least one imaging device in a shed, autonomously performing at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed, determining an impact of the at least one action on a shed environment of the shed by determining at least one change of the at least one bird of the plurality of poultry in the shed environment, and improving the shed state prediction model based on the impact of the at least one action on the shed environment.

What is claimed is:

1. A method comprising:
   training, by at least one processor, a shed state prediction model using a library of data associated with poultry from a first farm and a second plurality of farms by executing pre-training using a pretrained model based on the second plurality of farms and performing transfer learning on the first farm, the shed state prediction model associated with desired shed state goals for the first farm;
   receiving, by the at least one processor, realtime information associated with a plurality of poultry from at least one sensor and at least one imaging device in a shed on the first farm;
   autonomously performing, by the at least one processor, at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed;

determining, by the at least one processor, an impact of the at least one action on a shed environment of the shed at the first farm by determining at least one change of the at least one bird of the plurality of poultry in the shed environment; and improving, by the at least one processor, and continuously refining the shed state prediction model using continuous learning with the library of data from the first farm and the second plurality of farms based on the impact of the at least one action on the shed environment at the first farm.

2. The method of claim 1, further comprising generating a media snippet comprising information associated with at least one moment associated with the impact of the at least one action, the media snippet having a level of importance.

3. The method of claim 2, wherein the media snippet comprises one of a video file, an audio file, and an image file associated with the at least one moment.

4. The method of claim 2, further comprising sending the media snippet to at least one client computing device of a user having a security level that is greater than or equal to the level of importance.

5. The method of claim 1, further comprising following, by the at least one sensor and the at least one imaging device, at least one bird of the plurality of poultry to determine data about the at least one bird after performing the at least one action and determining welfare metrics for the at least one bird based on the data.

6. The method of claim 1, wherein the at least one imaging device comprises at least one pan, tilt, zoom (PTZ) camera, the method further comprising performing autonomous scanning using at least one of passive scanning and active scanning of the shed environment using the at least one pan, tilt, zoom (PTZ) camera.

7. The method of claim 1, further comprising generating an audiovisual topology of the shed environment based on the realtime information associated with the plurality of poultry from the at least one sensor and the at least one imaging device.

8. The method of claim 7, wherein the at least one sensor comprises the at least one microphone and the audiovisual topology based on data from the at least one microphone in the shed environment.

9. The method of claim 7, further comprising automatically determining at least one area of interest in the shed environment and labeling the at least one area of interest based on the audiovisual topology of the shed environment.

10. The method of claim 7, further comprising influencing a state of the shed environment using the at least one action to optimize a state of the plurality of poultry.

11. The method of claim 10, further comprising determining an impact of the at least one action on each bird of the plurality of poultry.

12. The method of claim 7, further comprising storing information associated with the audiovisual topology of the shed information in a database and sending at least one alert associated with an action in the shed environment to request that a person visit the shed environment.

13. The method of claim 12, wherein the person comprises one of a farmer and a veterinarian.

14. The method of claim 7, further comprising determining whether each bird of the plurality of poultry is happy or unhappy based on sound types received by the at least one sensor.

15. The method of claim 7, wherein the audiovisual topology comprises a three-dimensional model.

16. The method of claim 15, wherein the three-dimensional model is displayed by at least one of a virtual reality display and an augmented reality display.

17. The method of claim 1, wherein the at least one sensor comprises a temperature sensor, a humidity sensor, a $CO_2$ sensor, an ammonia sensor, and at least one microphone.

18. The method of claim 1, further comprising collecting at least one image from at least one pan, tilt, zoom (PTZ) camera to determine at least one of bird behavior, shed properties of the shed environment, bird health, bird to bird interaction, farmer to bird interaction, farmer to farmer interaction, and farmer to shed interaction.

19. The method of claim 1, further comprising defining the shed state prediction model based on user setup information associated with lidar processing, stereo image processing, and pan, tilt, zoom (PTZ) camera scanning information to build a view of the shed environment.

20. The method of claim 1, further comprising detecting at least one bird of the plurality of poultry to be making sounds indicating the at least one bird is unwell based on audio information having a first resolution level and directing the at least one microphone to determine a second resolution level of audio information higher than the first resolution level associated with the at least one bird.

21. The method of claim 1, further comprising detecting at least one bird of the plurality of poultry to be unwell based on visual information having a first resolution level and directing the at least one imaging device to determine a second resolution level of visual information higher than the first resolution level associated with the at least one bird.

22. The method of claim 1, further comprising generating a three-dimensional shed topology for the shed environment to provide a virtual shed walk of the shed environment and display the virtual shed walk on one of an augmented reality (AR) display and a virtual reality (VR) display.

23. The method of claim 1, further comprising receiving input comprising a change in the shed state goals and modifying the shed state prediction model based on the change in the shed state goals.

24. A system comprising:
at least one processor of a computing device to:
train a shed state prediction model using a library of data associated with poultry from a first farm and a second plurality of farms by executing pre-training using a pretrained model based on the second plurality of farms and performing transfer learning on the first farm, the shed state prediction model associated with desired shed state goals for the first farm;

receive realtime information associated with a plurality of poultry from at least one sensor and at least one imaging device in a shed on the first farm;

autonomously perform at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed;

determine an impact of the at least one action on a shed environment of the shed at the first farm by determining at least one change of the at least one bird of the plurality of poultry in the shed environment; and improve and continuously refine the shed state prediction model using continuous learning with the library of data from the first farm and the second plurality of farms based on the impact of the at least one action on the shed environment at the first farm.

25. A non-transitory computer-readable storage medium, having instructions stored thereon that, when executed by at least one computing device cause the at least one computing device to perform operations, the operations comprising:
training a shed state prediction model using a library of data associated with poultry from a first farm and a second plurality of farms by executing pre-training using a pretrained model based on the second plurality of farms and performing transfer learning on the first farm, the shed state prediction model associated with desired shed state goals for the first farm;
receiving realtime information associated with a plurality of poultry from at least one sensor and at least one imaging device in a shed on the first farm;
autonomously performing at least one action on a shed environment of the shed, the at least one action comprising at least one of directing at least one lighting device to point to at least one particular location in the shed, generating at least one sound in at least one particular location in the shed, providing food to at least one bird of the plurality of poultry in the shed, modifying a temperature in the shed, modifying a humidity in the shed, and modifying an overall level of light in the shed;
determining an impact of the at least one action on a shed environment of the shed at the first farm by determining at least one change of the at least one bird of the plurality of poultry in the shed environment; and
improving and continuously refining the shed state prediction model using continuous learning with the library of data from the first farm and the second plurality of farms based on the impact of the at least one action on the shed environment at the first farm.

* * * * *